US009260190B2

(12) United States Patent
Ehlers et al.

(10) Patent No.: US 9,260,190 B2
(45) Date of Patent: Feb. 16, 2016

(54) SLIDING FLIGHT ATTENDANT SEAT

(71) Applicant: Airbus Operations GmbH, Hamburg (DE)

(72) Inventors: Bernd Ehlers, Hamburg (DE); Mark Herzog, Hamburg (DE); Stefan Behrens, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 110 days.

(21) Appl. No.: 13/949,015

(22) Filed: Jul. 23, 2013

(65) Prior Publication Data

US 2014/0027572 A1     Jan. 30, 2014

Related U.S. Application Data

(60) Provisional application No. 61/674,880, filed on Jul. 24, 2012.

(30) Foreign Application Priority Data

Jul. 24, 2012   (DE) .......................... 10 2012 014 619

(51) Int. Cl.
 *A47C 9/06*   (2006.01)
 *B64D 11/06*   (2006.01)
(52) U.S. Cl.
 CPC ............ *B64D 11/06* (2013.01); *B64D 11/0691* (2014.12)
(58) Field of Classification Search
 CPC .......... B64D 11/06; B64D 11/02; A47C 7/56; A47C 7/60

USPC ....................... 297/14, 337; 244/118.5, 118.6
 See application file for complete search history.

(56) References Cited

U.S. PATENT DOCUMENTS

| 3,594,037 | A | * | 7/1971 | Sherman ......................... 297/14 |
| 4,460,215 | A | * | 7/1984 | Chamberlain et al. .......... 297/14 |
| 4,993,666 | A | * | 2/1991 | Baymak et al. ............ 244/122 R |
| 8,770,659 | B2 | * | 7/2014 | Isherwood et al. ............. 297/14 |
| 2009/0206200 | A1 | | 8/2009 | Bolder et al. |

FOREIGN PATENT DOCUMENTS

| DE | 3629505 | 3/1988 |
| DE | 3790556 | 10/1996 |
| DE | 102008009938 | 3/2009 |
| EP | 2484589 | 8/2012 |
| FR | 1531807 | 7/1968 |
| GB | 875049 | 8/1961 |

OTHER PUBLICATIONS

German Search Report, May 17, 2013.

* cited by examiner

*Primary Examiner* — Laurie Cranmer
(74) *Attorney, Agent, or Firm* — Greer, Burns & Crain Ltd.

(57) ABSTRACT

A flight attendant seat, an aircraft monument assembly having such a flight attendant seat, and also an aircraft having an aircraft monument assembly of this kind. In one embodiment, the flight attendant seat includes a backrest element, a seat element and a guiding apparatus for holding the flight attendant seat in a starting position. The guiding apparatus according to this embodiment is also configured so that the flight attendant seat is movable, in a direction transverse to the longitudinal axis of the backrest element, from the starting position into at least one end position.

10 Claims, 4 Drawing Sheets

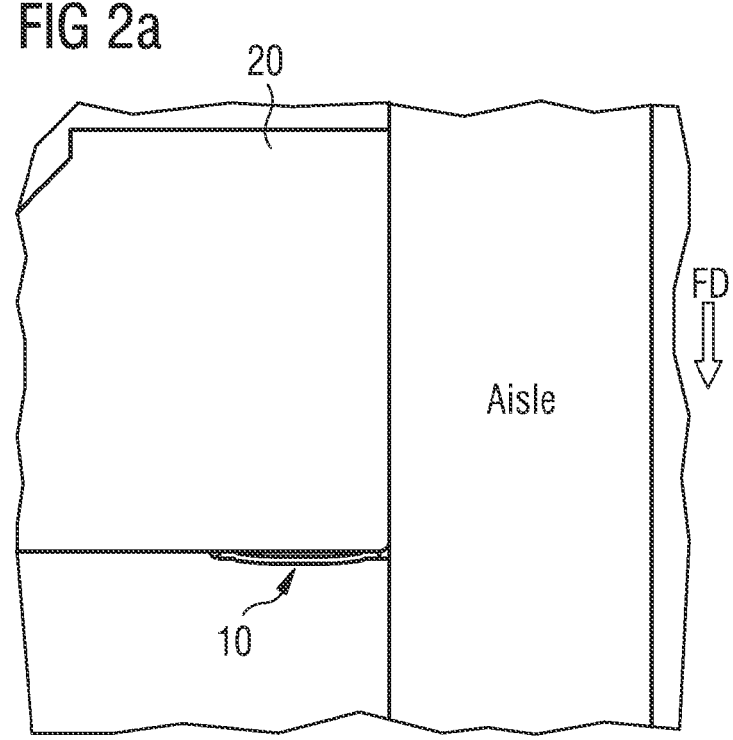
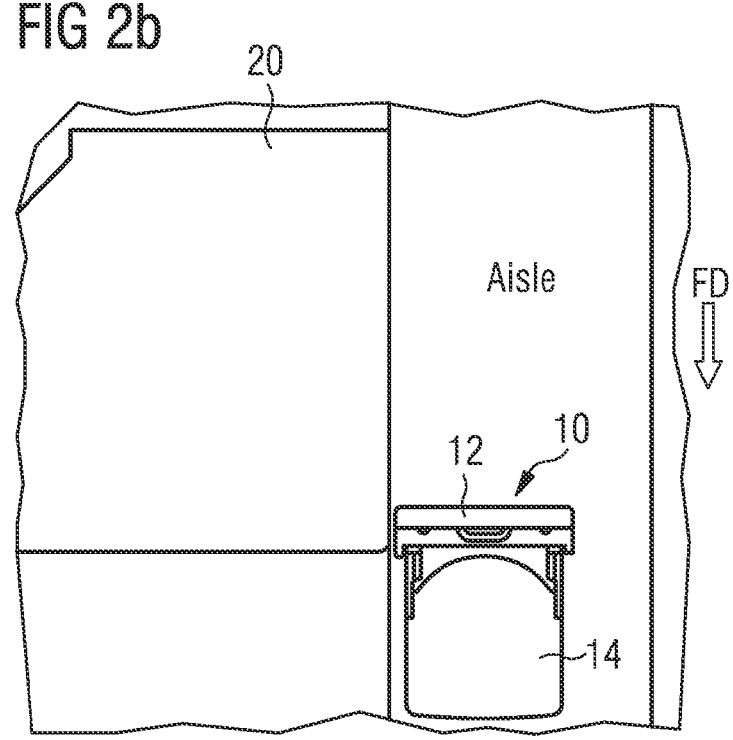

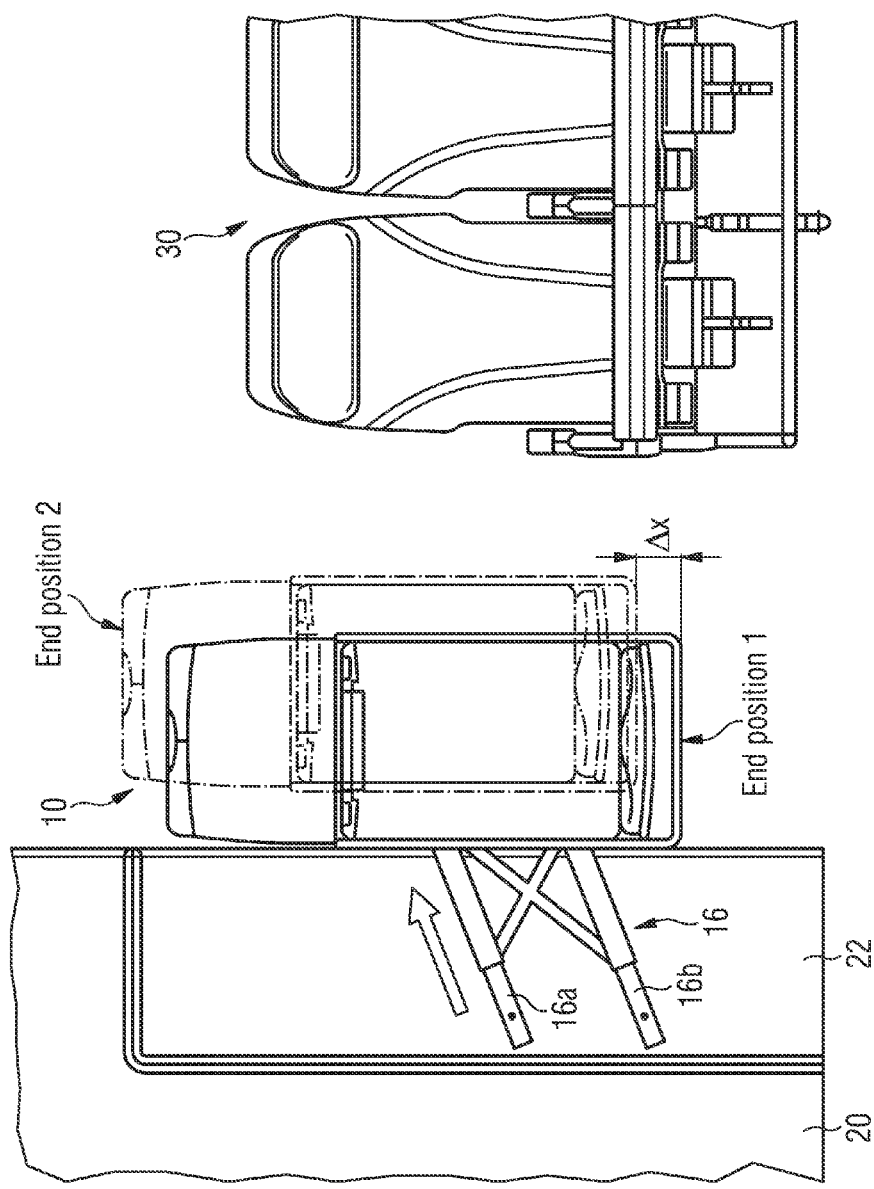

SLIDING FLIGHT ATTENDANT SEAT

CROSS-REFERENCES TO RELATED APPLICATIONS

This application claims the benefit of the U.S. Provisional Application No. 61/674,880, filed on Jul. 24, 2012, and of the German patent application No. 10 2012 014 619.1 filed on Jul. 24, 2012, the entire disclosures of which are incorporated herein by way of reference.

BACKGROUND OF THE INVENTION

The present invention relates to a flight attendant seat, to an aircraft monument assembly having such a flight attendant seat, and also to an aircraft having an aircraft monument assembly of this kind.

Flight attendant seats provided in the passenger cabin of a modern commercial aircraft are used by the cabin staff, particularly during takeoff and landing of the aircraft.

A current flight attendant seat, such as is described, for example, in DE 10 2008 009 938 A1 and US 2009/0206200 A1, comprises a carrier element, which is subdivided into a base element and a backrest element, and also a seat element which is fastened to the carrier element and is constructed as a folding seat element. When the flight attendant seat is not in use, the seat element is located in a folded-up position in a space-saving manner, i.e., a seating surface of the seat element faces towards a front side of the backrest element of the carrier element. The flight attendant seat is fastened to the floor of the aircraft cabin via the base element of the carrier element.

A swivellable flight attendant seat which has not only a swivellable seat part but also a swivellable backrest is described in DE 37 90 556 C1.

When swivellable flight attendant seats (which are often designed as rotatable flight attendant seats) are not in use, the backrest element is usually located in a position such that the seat element and a front side of the backrest element face away from the interior of the passenger cabin. When the flight attendant seat is in an operating position, on the other hand, the seat element and the front side of the backrest element are accessible from the interior of the passenger cabin, so that a flight attendant can sit down on the seat element.

So-called "single or double flight attendant seats" (normally referred to in English as "single cabin attendant seats" and "double cabin attendant seats"), which can be fastened rigidly to monuments which are present in an aircraft and to the floor of said aircraft, also exist. The rotatable flight attendant seats, on the other hand, can be rotatably fastened both to the floor and also to an aircraft monument.

Irrespective of the precise configuration of the flight attendant seats, they are usually used by the cabin staff only during the takeoff and landing procedures. However, the makeup of a flight attendant seat should be comparable with that of a regular (passenger) seat. In order to be able to arrange as many passenger seats as possible in the passenger cabin, it is desirable for as little space as possible to be taken up by the flight attendant seat or seats.

It is an object of the present invention to make available a space-saving flight attendant seat, an aircraft monument assembly having such a space-saving flight attendant seat, and also an aircraft having an aircraft monument assembly of this kind.

SUMMARY OF THE INVENTION

According to a first aspect, a flight attendant seat for an aircraft is provided. The flight attendant seat comprises a backrest element, a seat element and a guiding apparatus. The guiding apparatus is configured to hold the flight attendant seat in a starting position. Said guiding apparatus is also configured so that the flight attendant seat is movable, in a direction transverse to the longitudinal axis of the backrest element, from the starting position into at least one end position.

The seat element may be understood to mean any element which is configured so that one or more persons, such as one or more flight attendants, can sit down on it in a normal sitting position. The back element may be regarded as any element which is constructed so that the person or persons sitting on the seat element, such as the flight attendant or attendants, is/are able to rest their back in the normal sitting position. If reference is not made below to the flight attendant seat which has the seat element, the backrest element and the guiding apparatus, but merely to the arrangement formed by the seat element and the backrest element without the guiding apparatus, this arrangement is described as the "seat arrangement."

In a normal or current state of installation, the backrest element is usually located at least almost perpendicularly to the floor of the aircraft or the direction of flight of the aircraft or the longitudinal axis of the aircraft. In the normal or current state of installation, the longitudinal axis extending through the backrest element stands at least almost perpendicularly on the floor of the aircraft (or the direction of flight of the aircraft or the longitudinal axis of the aircraft).

The direction in which the flight attendant seat is movable, starting out from the starting position, may be set or determined by the configuration and/or arrangement and/or shape of the guiding apparatus.

The direction transverse to the longitudinal axis of the backrest element may be understood to mean any direction which does not extend parallel to the longitudinal axis of the backrest element. For example, the direction in which the flight attendant seat is movable (can be moved) from the starting position into the at least one end position, may extend transversely to the longitudinal axis of the backrest element and transversely to the longitudinal axis of the aircraft (transversely to the direction of flight of the aircraft).

According to a first possible configuration, it is conceivably possible for the flight attendant seat to be movable, in a direction perpendicular to the longitudinal axis of the backrest, from the starting position into the at least one end position. The direction in which the flight attendant seat is movable into the end position, starting out from the starting position, may also stand perpendicularly to the longitudinal axis of the aircraft (the direction of flight of the aircraft).

According to a second possible configuration, the guiding apparatus may be configured in such a way that the direction transverse to the longitudinal axis of the backrest element, in which the flight attendant seat is movable from the starting position into the at least one end position, is not perpendicular to (does not stand perpendicularly on) the longitudinal axis of the backrest element. According to the second possible configuration, the direction in which the flight attendant seat is movable from the starting position into the at least one end position, may form an angle with a straight line which stands perpendicularly on the longitudinal axis of the backrest element, i.e., a normal of said longitudinal axis of the backrest element.

The guiding apparatus may also comprise a rail arrangement or be constructed as such. The flight attendant seat may be capable of being guided or brought from the starting position into the end position along the rail arrangement. Said rail arrangement may, for example, have a linear guide or telescopic guide, or be constructed as such. If the rail arrangement is a telescopic guide, the guiding elements of said telescopic guide may be constructed as partial extensions, full extensions, over-extensions or carriage guides.

According to a first possible embodiment of the flight attendant seat according to the first aspect, it is conceivably possible for said flight attendant seat to be movable to and fro between the starting position and the end position through the fact that the seat arrangement slides along on the rail arrangement, such as on rails for example. According to the first embodiment, the seat arrangement is movable on, and relative to, the rail arrangement.

According to a second possible embodiment of the flight attendant seat according to the first aspect, it is conceivably possible for said flight attendant seat to be movable to and fro between the starting position and the end position through the fact that the flight attendant seat is moved by the extension and retraction of the rails which are constructed as a telescopic guide. According to the second embodiment, the seat arrangement does not slide along on the rails but is rigidly or fixedly connected to them.

According to a third possible embodiment of the flight attendant seat according to the first aspect, it is conceivably possible for the first and second embodiments to be combined with one another. According to the third embodiment, the seat arrangement is movable between the starting position and the end position through the fact that it slides along on the rails. In addition, the rails can be retracted and extended.

The rail arrangement may extend, for example, in the direction transverse to the longitudinal axis of the backrest element. As a result, the flight attendant seat can be guided or pushed along the rail arrangement in the direction transverse to the longitudinal axis. Said rail arrangement may have, for example, one, two, three, four or more rails, by which the flight attendant seat can be guided.

According to the aforesaid second possible configuration, the direction transverse to the longitudinal axis of the backrest element may form an acute angle with a normal (perpendicular) of the longitudinal axis of said backrest element. In this case, the normal of the longitudinal axis may stand perpendicularly to the longitudinal axis of the aircraft (the direction of flight of the aircraft). The acute angle may lie, for example, between 10 and 45 degrees, such as between 20 and 30 degrees for example. 20 degrees, 25 degrees and 30 degrees are mentioned here, purely by way of example, as possible values for the angle.

The guiding apparatus may be constructed and arranged in such a way that the distance of the end position above the floor of the aircraft is greater than the distance of the starting position above said floor. In other words, the height of the end position may be greater than the height of the starting position (which may also be described as the "initial position"). The direction of movement of the flight attendant seat from the starting position into the end position may extend, so to speak, diagonally or obliquely, relative to the floor of the aircraft.

The guiding apparatus may be constructed in such a way that the flight attendant seat moves back automatically into the starting position from the end position. The direction from the end position into the starting position may correspond to the reverse, or mirrored, direction from the starting position into the end position. This may, for example, come about, in keeping with the abovementioned second possible configuration (according to which the direction of movement of the flight attendant seat transversely to the longitudinal axis of the backrest element may form an acute angle with the normal of the longitudinal axis of said backrest element), through the fact that the distance of the end position above the floor of the aircraft is greater than the distance of the starting position above said floor. As a result of this, the guiding apparatus may extend, so to speak, diagonally or obliquely upwards (viewed in the direction of the end position). Because of the downhill force resulting from the diagonal or obliquity, the flight attendant seat may move back automatically from the end position into the starting position along the guiding apparatus, if the downhill force is greater than the counteracting forces such as, for example, the frictional force operating between the seat arrangement and said guiding apparatus.

According to one conceivable realisation of the flight attendant seat according to the first aspect, the seat element and the backrest element may be rotatable, relative to one another, about an axis of rotation (which may extend, for example, perpendicularly to the longitudinal axis of said backrest element), in order to move the seat element between an inoperative position and an operating position. For this purpose, the seat element may be designed, for example, as a folding seat element. When said seat element is in the folded-up state, a seating surface of the seat element may rest against a front side of the backrest element. When the seat element is in the folded-down state, said seat element, or the seating surface of said seat element, may extend substantially perpendicularly to the front side of the backrest element. When said seat element is in its folded-down state, a flight attendant can sit down on the flight attendant seat, for example during the takeoff and landing of the aircraft.

In keeping with a first possible variant of the conceivable realisation of the flight attendant seat according to the first aspect, it is conceivably possible for the flight attendant seat to be locked in the end position when the seat element is in the operating position, for example in the folded-down state. According to this first variant, the flight attendant seat does not move or slide back automatically from the end position into the starting position while it is locked. Only when the seat element is moved into its inoperative position, for example rests against the backrest element, is the locking action released, for example, and the flight attendant seat is able to move back automatically into the starting position. According to a second possible variant of the conceivable realisation of the flight attendant seat according to the first aspect, locking may take place irrespective of the position of the seat element. For example, a locking mechanism may be triggered manually by means of an actuating element.

There are numerous possible ways in which the locking of the flight attendant seat in the end position can be achieved. For example it is conceivably possible for said flight attendant seat to be held (locked) in the end position by a friction-locking connection or form-locking connection. The friction-locking connection may be brought about, for example, through the fact that an element (e.g., a bolt or projection) comes into (frictional) contact with the guiding apparatus, and thereby forms a friction-locking connection, when the seat element is moved into the operating position. If the force brought about by the friction-locking connection is greater than the force that impels the flight attendant seat into the starting position, e.g., the downhill force, movement of the flight attendant seat into the starting position, e.g., a sliding-down of said seat from the end position into the starting position, is prevented by the friction-locking connection. Alternatively, a bolt or peg may, for example enter into a form-locking connection with the guiding apparatus as a result of the folding-out of the seat element into the operating position, for example may travel into a toothed-rack guide belonging to the guiding apparatus and, in this way, immobilize (lock) the flight attendant seat. The two possible realisations of the locking mechanism that have been mentioned are to be understood as being purely by way of example, and said locking mechanism is not restricted to these examples.

The flight attendant seat may be attachable, via the guiding apparatus, to an aircraft monument, for example to a front, rear or side wall of said monument. The aircraft monument in question may be a galley, a toilet module, a partition or some other aircraft monument installed in the aircraft cabin.

According to the details and aspects previously described, the following scenario is conceivably possible: When the passengers board (the boarding procedure), the flight attendant seat may be located in the starting position. For this purpose, said flight attendant seat may be arranged in such a way that it takes up virtually no space inside the aircraft. For example, it may be arranged on a wall of an aircraft monument that faces in the direction of flight. In addition, there may be provided in said wall a recess whose contour corresponds, for example, to the outline of the flight attendant seat or to the backrest element of said flight attendant seat, or is larger than the said outline. The depth of the recess may be coordinated with, for example correspond to, the depth of the backrest element or the depth of the flight attendant seat with the seat element folded in. In the latter case, the flight attendant seat does not protrude from the aircraft monument into the rest of the interior of the aircraft when in the starting position.

During the takeoff procedure, the flight attendant seat can be moved into the end position, so that a flight attendant can sit down on the seat element. For this purpose, the flight attendant seat can be moved, for example perpendicularly to the direction of flight and obliquely relative to the floor of the aircraft, into an aisle region of said aircraft, in which no passenger is normally allowed to stay in any case during the takeoff procedure (likewise during the landing procedure) and in which no passenger seats are arranged. Even when in the end position, the flight attendant seat thus causes no problems to passenger seats or passengers. After the takeoff procedure has been completed, the flight attendant is able to leave the seat and devote himself to his tasks that arise during the flight. The seat, which has been still kept in the end position during the takeoff procedure, e.g., by the weight of the flight attendant and/or as a result of being locked, is then able to pass automatically into the starting position, for example because of the downhill force brought about by the obliquity of the guiding apparatus. The flight attendant seat can therefore be located in the space-saving starting position during the normal phase of flight (often referred to in English as the "cruise flight phase"), i.e., in the phase between a takeoff procedure and a landing procedure. When the landing procedure is initiated, the flight attendant seat can be moved into the end position, as described with reference to the takeoff procedure.

According to a second aspect, an aircraft monument assembly is provided, which has an aircraft monument such as has been/will be described herein, and a flight attendant seat, such as has been/will be described herein, which is fastened to a wall of said aircraft monument.

According to a third aspect, an aircraft having such an aircraft monument assembly is provided.

BRIEF DESCRIPTION OF THE DRAWINGS

The invention will be explained in greater detail below with the aid of the appended diagrammatic drawings, in which:

FIG. 2a shows, in a view from above, a diagrammatic representation of a flight attendant seat according to the first embodiment, which is attached to an aircraft monument and is located in the starting position;

FIG. 2b shows, in a view from above, a diagrammatic representation of a flight attendant seat according to the first embodiment, which is attached to an aircraft monument and is located in the end position;

FIG. 3 shows a diagrammatic representation of a flight attendant seat according to a second embodiment, which is attached to an aircraft monument and can be brought into a number of end positions.

DETAILED DESCRIPTION OF THE PREFERRED EMBODIMENTS

Figure 1A:
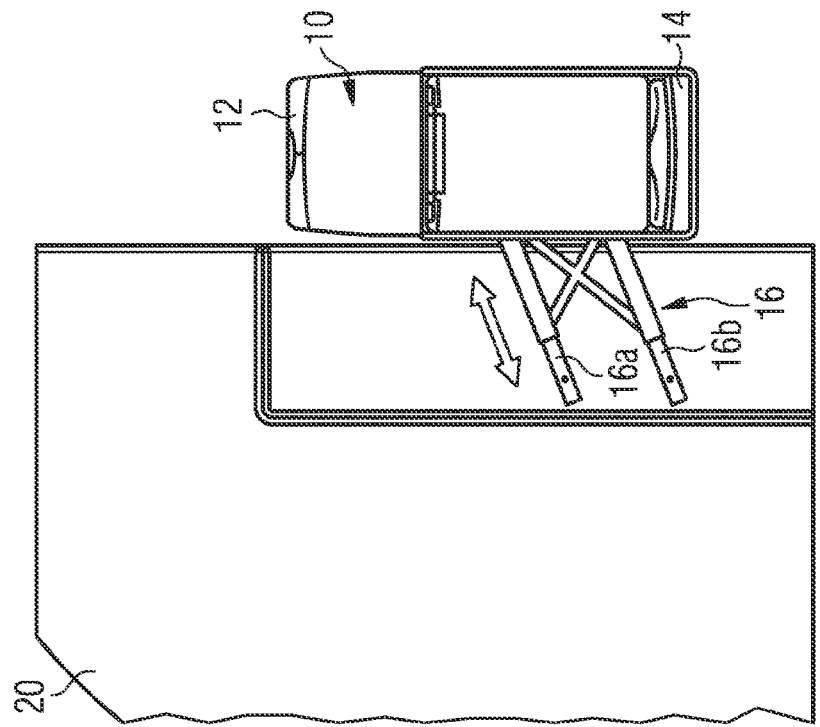
FIG. 1a shows, in a front view, a diagrammatic representation of a flight attendant seat according to a first embodiment, which is attached to an aircraft monument and is located in a starting position.

FIGS. 1a, 1b, 2a and 2b show an aircraft monument assembly having a flight attendant seat 10 according to a first embodiment, which is arranged on an aircraft monument 20 belonging to an aircraft, in various views and operating positions. It will be assumed below, by way of example, that the flight attendant seat 10 in question is a seat that can be folded in and out, i.e., a seat element 14 of the flight attendant seat 10 can be folded from an inoperative position into an operating position, relative to a backrest element 12. In the inoperative position, the seating surface of the seat element 14 rests against the backrest 12 (see FIGS. 1a and 2a). In the operating position, the seat element 14 is folded out and located parallel to the floor. That surface of the seat element 14 which is the opposite surface from the seating surface of said element points towards the floor of the aircraft. The seat element 14 is thus available to a flight attendant as a seating facility.

As can be perceived in FIGS. 2a and 2b, the flight attendant seat 10 is attached, purely by way of example, to a wall of the aircraft monument 20 that points in the direction of flight of the aircraft (in FIGS. 2a and 2b, the direction of flight is identified by the arrow designated FD). However, the flight attendant seat 10 may equally well be attached to any other wall of the aircraft monument 20 that points into the aircraft cabin. It may be assumed, purely by way of example, that the aircraft monument 20 in question is a toilet module. However the aircraft monument 20 in question may also include other monuments, such as a galley.

FIGS. 1a and 2a show the flight attendant seat 10 in a starting position. Said flight attendant seat 10 may be stowed in the starting position in a space-saving manner during periods of time in which it is not needed by the flight attendant. Examples of such periods of time are the boarding procedure and the flight phase (cruise flight phase). As can be seen in FIG. 2a, the flight attendant seat 10 scarcely protrudes from the wall of the monument 20 when in the starting position. It can be perceived that the seat element 14 of the flight attendant seat 10 is folded in (the inoperative position) in FIGS. 1a and 2a which show the starting position of said seat e.g., during boarding.

Figure 1B:
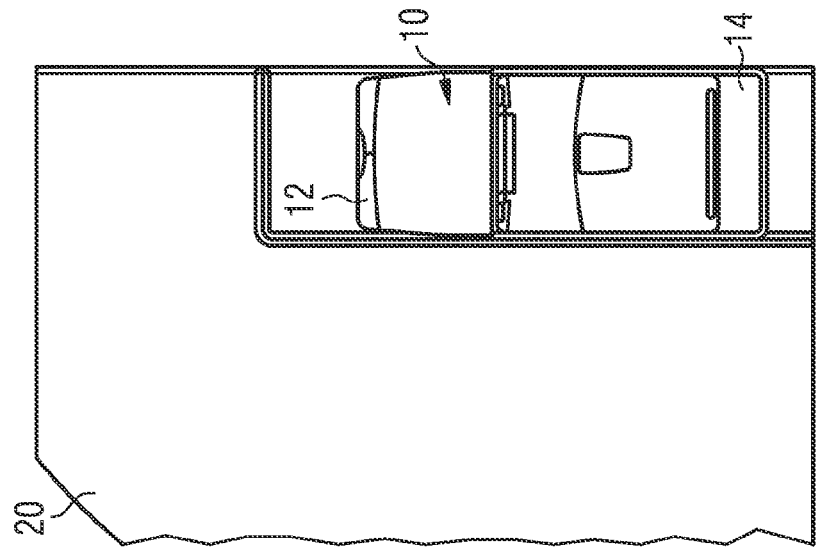
FIG. 1b shows, in a front view, a diagrammatic representation of a flight attendant seat according to the first embodiment, which is attached to an aircraft monument and is located in an end position.

FIGS. 1b and 2b show the flight attendant seat 10 in an end position. In the said end position, the flight attendant seat 10 is arranged in an offset manner, relative to the aircraft monument 20, and projects into an aisle of the aircraft. In the end position shown in FIGS. 1b and 2b, the seat element is folded out (the operating position). It is also possible to make out a guiding apparatus, which is constructed as a rail arrangement 16, by way of example, and via which the flight attendant seat 10 is fastened to the aircraft monument 20. The rail arrangement 16 has, by way of example, two rails (16a, 16b) which carry the flight attendant seat 10 in its starting position and via which said seat can be guided into its end position. In FIGS. 1a to 2b, the rails 16a, 16b are each constructed, purely by way of example, as a telescopic guide. Each of the two telescopic guides can be extended and retracted in the desired manner. Said telescopic guides can also be fixed in the desired position, such as the desired retracted and extended states. The rails 16a, 16b engage in associated guide sections of the seat arrangement and support said arrangement against the force of gravity. The flight attendant seat 10 is held in the starting position with the aid of the rail arrangement 16. It is possible to make out, in FIG. 1b, the the way in which the rails 16a, 16b act on or in the backrest element 12 and thereby support the seat arrangement. Said seat arrangement is capable of sliding on the rails from the starting position into the end position and, conversely, from the end position into the starting position.

As can be perceived in FIG. 1b, the rail arrangement 16 does not extend horizontally in relation to the floor, but is inclined at an obliquity in relation to the latter. In other words, the rail arrangement 16 forms an acute angle with a normal of the longitudinal axis of the backrest element 12. This normal is also perpendicular to the direction of flight FD. Because of the inclination of the rail arrangement 16, the flight attendant seat 10 normally does not move (or virtually does not move) out of the starting position.

During the takeoff procedure, the flight attendant will usually sit down on the flight attendant seat 10. With the aid of the rail arrangement 16, said flight attendant seat 10 can be moved into the end position which is located in a region in which no passenger seats are arranged. In the embodiment which is shown, by way of example, with reference to FIGS. 1a to 2b, the end position is located in an aisle region of the aircraft, i.e., the flight attendant seat 10 projects into said aisle region.

Represented in FIG. 3 is a flight attendant seat 100 according to a second embodiment. Said flight attendant seat 100 according to the second embodiment is substantially identical to the flight attendant seat 10 according to the first embodiment. The difference between the two embodiments consists in the fact that the flight attendant seat 100 according to the second embodiment can be brought or moved not only into one end position but into a number of end positions. What is represented by way of example in FIG. 3, as examples of this plurality of end positions, is the fact that the flight attendant seat 100 can be moved into two end positions (as an example of a plurality of end positions). However, any desired number of intermediate positions located between the end positions shown are also conceivably possible as additional end positions.

As can be perceived in FIG. 3, in the first end position, the flight attendant seat 100, or more precisely the lower edge of said flight attendant seat 100 or the side that faces away from the seating surface of the seat element 14, is arranged less far above the floor than in the second end position. The second end position is therefore also referred to as the "maximum extension," whereas the first end position is referred to as the "minimum extension." At the maximum extension, the flight attendant seat 100 is located further above the floor than in the minimum extension. In FIG. 3, the difference in height between the maximum and minimum extensions is designated "Ax." With the aid of the flight attendant seat 100 according to the second embodiment, it is possible to individually set heights which are appropriate or suitable for the particular flight attendant. As can be perceived in FIG. 3, the end position is located in an aisle region. The passenger seats 30 and the passengers sitting on them are not affected or influenced by the flight attendant seat 100, either in the starting position or in the end position.

The flight attendant seats 10, 100 in the first and second embodiments are already kept in the end position or positions, respectively, by the flight attendant's weight.

Figure 4:
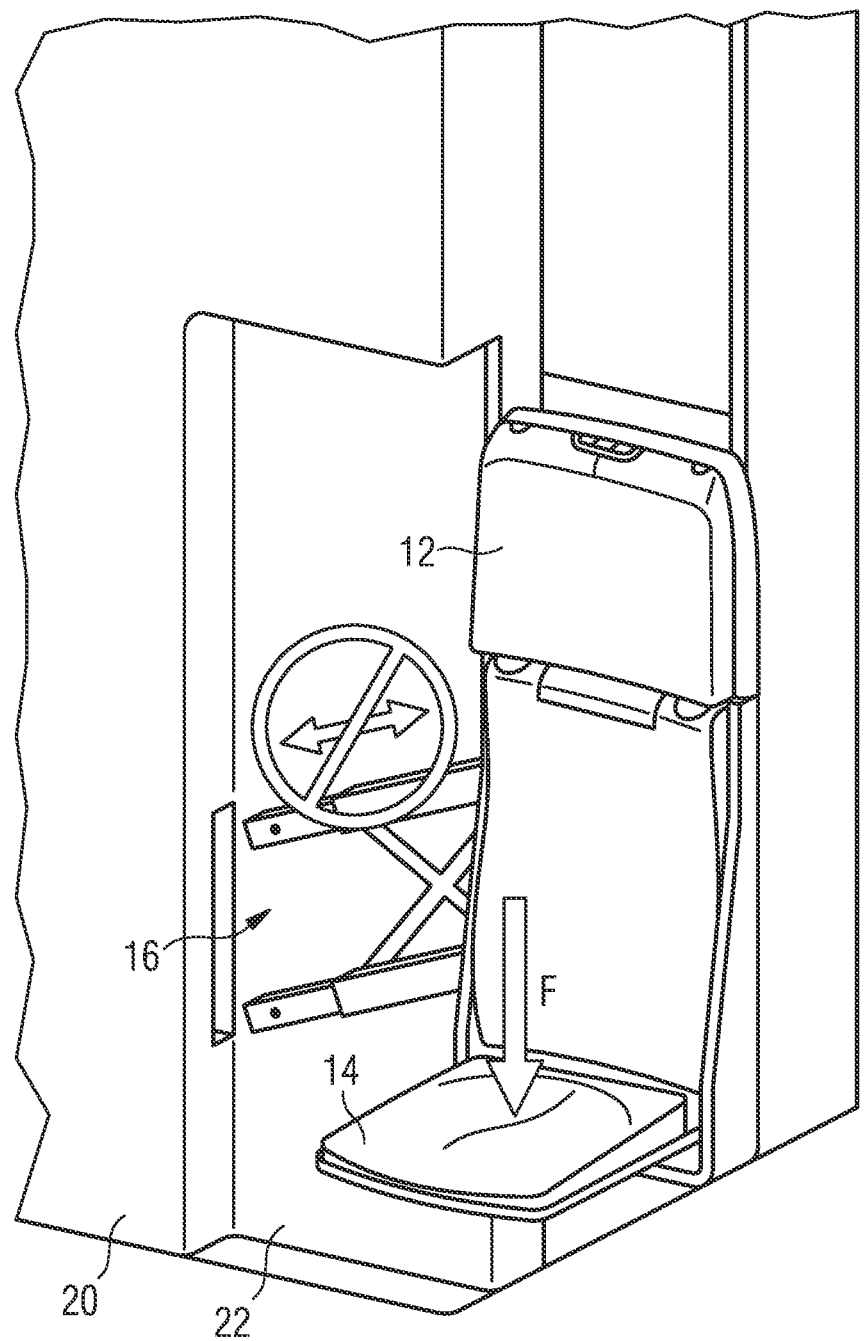
FIG. 4 shows a diagrammatic representation of a flight attendant seat according to the first and second embodiments, in a locked end position.

In FIG. 4, an additional option is represented, which may be provided in the case of both the flight attendant seat 10 according to the first embodiment and the flight attendant seat 100 according to the second embodiment. The additional option will be described, purely by way of example, with reference to the flight attendant seat 10 according to the first embodiment, but can equally well be used in the case of the flight attendant seat 100 according to the second embodiment.

In keeping with this additional option, a locking mechanism is provided or arranged on the flight attendant seat 10. The flight attendant seat 10 is prevented, by the locking mechanism, from travelling or sliding back automatically from the end position into the starting position. In the example shown, the locking mechanism is activated by the fact that the seat element 14 is brought out of its inoperative position into its operating position, so that a flight attendant is able to sit down on said seat element 14. As a result of the movement of the seat element 14 into the operating position, the locking mechanism is actuated and holds the flight attendant seat 10 fast in the end position. The holding force brought about by the locking mechanism merely needs to be greater than the downhill force of the flight attendant seat 10 along the rail arrangement 16. The holding force is reinforced by the weight of the flight attendant sitting on the seat element 14 (this is indicated diagrammatically in FIG. 4 by the letter F and the associated force-indicating arrow). After the takeoff procedure, the flight attendant is able to stand up and fold the seat element 14 in. The locking mechanism is released by the folding-in operation. The downhill force acting on the seat arrangement then exceeds the frictional force operating between the seat arrangement and the rail arrangement 16, and the flight attendant seat 10 slides back automatically along the rail arrangement 16 into its starting position.

As can also be perceived in FIG. 4, a cavity or recess 22, which is adapted to the contours of the flight attendant seat 10 in such a way that the latter is able to pass into said recess 22 and be received by it, is provided in the aircraft monument 20. As a result, the flight attendant seat 10 does not protrude, or at least protrudes less, in relation to the wall of the aircraft monument 20 when in the starting position, and saves further space. The recess 22 may be provided in the aircraft monument 20, irrespective of whether the flight attendant seat 10 according to the first embodiment or the flight attendant seat 100 according to the second embodiment is connected to said aircraft monument 20.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A flight attendant seat for an aircraft, said seat comprising:
   a backrest element;
   a seat element; and
   a guiding apparatus for holding the flight attendant seat in a starting position, wherein the guiding apparatus is also configured so that said flight attendant seat is movable, in a direction transverse to a longitudinal axis of the backrest element, from the starting position into at least one end position,
   wherein the guiding apparatus is inclined at an obliquity relative to a normal of the longitudinal axis of the backrest element, and
   wherein the guiding apparatus is configured so that the flight attendant seat moves back automatically into the starting position from the at least one end position due to a downhill force resulting from the obliquity of the guiding apparatus.

2. The flight attendant seat according to claim 1, wherein the guiding apparatus comprises a rail arrangement along which said flight attendant seat is guidable from the starting position into the end position.

3. The flight attendant seat according to claim 2, wherein the rail arrangement extends in the direction transverse to the longitudinal axis of the backrest element.

4. The flight attendant seat according to claim 1, wherein the direction transverse to the longitudinal axis of the backrest element forms an acute angle with a normal of the longitudinal axis of said backrest element.

5. The flight attendant seat according to claim 4, wherein the acute angle is in the range of 10 to 45 degrees.

6. The flight attendant seat according to claim 1, wherein the guiding apparatus is configured so that a distance of an end position of the at least one end position above a floor of the aircraft is greater than a distance of the starting position above said floor of the aircraft.

7. The flight attendant seat according to claim 1, wherein two or more end positions are provided, in which the flight attendant seat occupies a different distance above the floor of the aircraft in each end position.

8. The flight attendant seat according to claim 1, wherein the flight attendant seat is attached to an aircraft monument via the guiding apparatus.

9. An aircraft monument assembly comprising:
   an aircraft monument; and
   a flight attendant seat according to claim 1 which is fastened to a wall of said aircraft monument.

10. An aircraft having an aircraft monument assembly according to claim 9.

* * * * *